Figure 1:
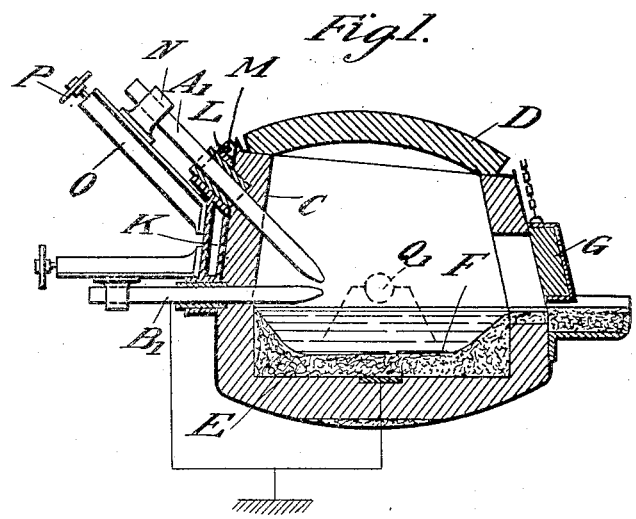

O. SAHLIN.
ELECTRIC FURNACE.
APPLICATION FILED MAY 1, 1918.

1,286,794.

Patented Dec. 3, 1918.

Inventor:
Olof Sahlin,
by Wilkinson & Giusta
Attorneys.

UNITED STATES PATENT OFFICE.

OLOF SAHLIN, OF LONDON, ENGLAND.

ELECTRIC FURNACE.

1,286,794.  Specification of Letters Patent.  Patented Dec. 3, 1918.

Application filed May 1, 1918. Serial No. 231,845.

*To all whom it may concern:*

Be it known that I, OLOF SAHLIN, a subject of the King of Sweden, residing in London, England, have invented certain new and useful Improvements in Electric Furnaces, of which the following is a specification.

The invention relates to electric furnaces for the smelting or refining of metals or other substances and consists in an improved arrangement of the electrodes and furnace construction.

According to the invention the electrodes are arranged so that the arc is either "free burning", that is, is formed between the two electrodes, or is "direct", that is, formed between the upper electrode and the bath of metal or other conducting material. For this purpose, one or more pairs of electrodes enter the furnace in a side wall, preferably, approximately opposite to a charging and discharging door. One electrode of each pair is substantially horizontal and the other which is placed above it is inclined downward, both electrodes being approximately in the same vertical plane.

The furnace is started by forming an arc in each pair between the inclined and horizontal electrodes.

By advancing the upper or inclined electrodes somewhat further into the furnace than the lower or horizontal ones, the electric arcs are forced forward across the furnace and downward toward the bottom.

When the furnace has been heated by these arcs to working temperature it is charged through the door placed opposite the electrodes, or through the top, the roof being removable. By this arrangement, it is practicable to put in the entire charge at one time, even if it is made up of light and voluminous scrap.

As soon as a portion of the charge is melted down by the electric arcs sufficiently to form a metal bath below the electrodes, the lower horizontal electrodes may be drawn back and the furnace tilted backward so far that the slag level comes close to the openings through the side wall for the horizontal electrodes and the upper inclined electrodes may then be advanced so as to form direct arcs with the bath.

It is known that the direct arc creates a considerable circulation in the bath, and that it is, therefore, more effective for refining and overheating the metal than the free-burning arc which transmits heat only by radiation to the surface of the bath and, therefore, is preferably employed only for melting down the charge.

If, however, the quality of the charge requires the formation of a heavy cover of slag for refining purposes, this slag will require more heat to make it rapidly liquefy. With the arrangement described it is practicable to have one pair of electrodes producing a free-burning (melting) arc, while the other pair is readjusted to form a direct (heating) arc, both arcs working simultaneously by the side of each other. As soon as the charge is wholly melted two direct arcs may be formed without interrupting the working of the furnace.

The current may be continuous or alternating; with two phase currents two pairs of electrodes and with three phase currents three pairs of electrodes are provided. If two or three phase currents are employed a conducting plate connects the horizontal electrode of each phase with the bottom of the lining of the furnace hearth.

When all direct arcs are burning, the bottom will transmit practically no current. If, however, one arc breaks, the other will not be affected, the bottom plate transmitting the unbalanced current.

The electric resistance in the bottom is regulated by the thickness of the layer of carbon or the like forming the lining of the hearth and is such that if the current is conveyed by the bottom electrode the voltage between the bath and one of the inclined electrodes is usually about half the normal voltage between two inclined electrodes. This will prevent current rushes when one direct arc is broken and started and also protect the bottom from being overheated.

The roof of the furnace is formed without openings and is shaped as a circular cupola, which can be turned around so that when one portion of the arch gets thin another undamaged portion may be placed over the hottest zone. In this way the maximum amount of work can be obtained from the roof before repairs are required.

By placing the roof at a slight angle to the horizontal the heat rays radiated and reflected from the bath and the arcs do not strike the roof arch normally, thus reducing the effect of the heat rays on the roof and therefore prolonging the life of the brick.

Figure 2:
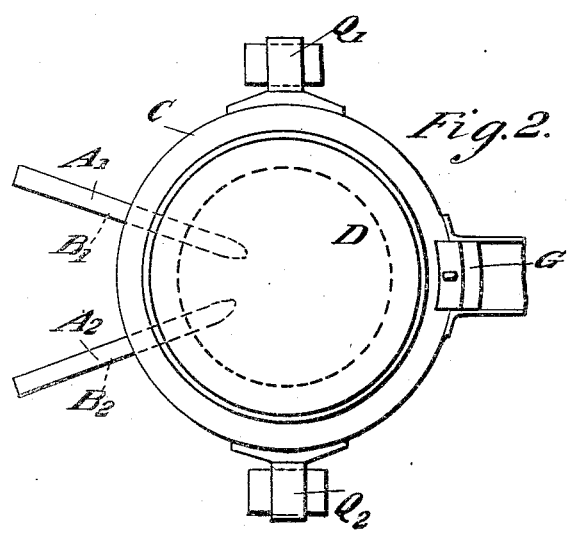
Figure 3:
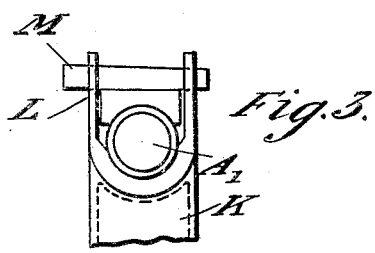

In the accompanying drawings which represent an example of a construction according to the invention, Figure 1 is a vertical section through the furnace, Fig. 2 is a plan and Fig. 3 shows a method of securing the cooling devices of the electrodes.

The electrodes $A_1$ and $B_1$ enter the furnace through a wall C which may be cylindrical, conical or of any other convenient form; the furnace roof shown at D is formed as a circular cupola inclined slightly to the horizontal and adapted to be turned about a nearly vertical axis. E is the lining separating the hearth F from the bottom and sides of the furnace. G is a door opposite to the electrodes and through which the charge can be inserted and withdrawn.

There may be several pairs of electrodes $A_1$, $B_1$, $A_2$, $B_2$, etc., and at least two pairs for a two phase and three pairs for a three phase circuit and each horizontal carbon $B_1$, $B_2$, etc., is connected to a conducting plate J at the bottom of the furnace lining. This plate is preferably connected to earth.

The electrodes enter the furnace through water-cooled boxes K which are held in place by cotters M which clamp the boxes to projections L of the furnace, and avoid the use of bolts which in such conditions may be a source of trouble.

Each upper electrode is mounted on a carriage N adapted to slide forward or backward on a frame O by means of a screw operated by handle P. Similar arrangements allow the lower electrodes to be moved in or out in a horizontal plane.

The furnace can be tilted in known manner about the trunnions $Q_1$, $Q_2$, or on rockers or rollers.

As explained above, the arcs (free-burning) are at first formed between the electrodes in the position shown; the upper electrodes are then advanced so as to drive the flame downward. When a metal bath has been formed below the electrodes, the horizontal electrodes are withdrawn, the furnace tilted, and the upper electrodes advanced so that direct arcs are formed between the upper electrodes and the bath.

Having thus described the nature of the said invention and the best means I know of carrying the same into practical effect, I claim:—

1. In an electric furnace, a pair of electrodes disposed one above the other and arranged to enter the furnace through a side wall thereof, the upper electrode being inclined downward while the lower electrode is substantially horizontal, both electrodes being approximately in the same vertical plane.

2. In an electric furnace, a plurality of electrodes arranged to enter the furnace through the side walls thereof in pairs, one electrode of each pair being disposed above the other, the upper electrode of each pair being inclined downward while the lower electrode is substantially horizontal, both electrodes forming a pair being approximately in the same vertical plane.

3. In an electric furnace in which multiple phase alternating currents are employed, the combination of a plurality of electrodes arranged to enter the furnaces through the side walls thereof in pairs, one electrode of each pair being disposed above the other, the upper electrode of each pair being inclined downward while the lower electrode is substantially horizontal, both electrodes forming a pair being approximately in the same vertical plane, a conducting plate at the bottom of the furnace so placed that the voltage between the plate and any one of the inclined electrodes is usually about half the normal voltage between two inclined electrodes, and an electrical connection between the conducting plate and each horizontal electrode.

4. In an electric furnace, a plurality of electrodes arranged to enter the furnace through the side walls thereof in pairs, one electrode of each pair being disposed above the other, the upper electrode of each pair being inclined downward while the lower electrode is substantially horizontal, both electrodes forming a pair projecting into the interior of the furnace and being approximately in the same vertical plane, and means for advancing and retracting the several electrodes separately and relatively to one another and the interior of the furnace as and for the purpose described.

5. In an electric furnace, the combination of a tilting furnace body structure, a removable roof carried thereby, a plurality of electrodes arranged to enter the furnaces through the side walls thereof in pairs, one electrode of each pair being disposed above the other, the upper electrode of each pair being inclined downward while the lower electrode is substantially horizontal, both electrodes forming a pair being approximately in the same vertical plane, and means for setting the electrodes constituting a pair relatively to one another and to the interior of the said body structure.

6. In an electric furnace, the combination of a tilting circular furnace body structure having a charging doorway and a door fitted thereto, a circular cupola shaped roof carried by the body structure in a manner to be slightly inclined to the horizontal plane and capable of being turned about a nearly vertical axis, a plurality of electrodes arranged to enter the furnace through the side walls thereof in pairs, one electrode of each pair being disposed above the other, the upper electrode of each pair being inclined downward while the lower electrode is substantially horizontal, both electrodes forming a pair being aproximately in the same vertical plane, and means for setting the electrodes constituting a pair relatively to one another and to the interior of the said body structure.

7. In an electric furnace, the combination of a furnace body structure having projections on the side walls thereof, water cooled boxes secured to the said projections, a plurality of electrodes supported by the said boxes and arranged to enter the furnace through the side walls thereof in pairs, one electrode of each pair being disposed above the other, the upper electrode of each pair being inclined downward while the lower electrode is substantially horizontal, both electrodes forming a pair being approximately in the same vertical plane, and means for setting the electrodes constituting a pair relatively to one another and to the interior of the furnace.

In testimony whereof I have signed my name to this specification in the presence of two subscribing witnesses:

OLOF SAHLIN.

Witnesses:
ARVID CEDERSTRÖM,
FRITZ WALLIN.